(12) United States Patent
Ochiai (10) Patent No.: US 10,409,268 B2
(45) Date of Patent: Sep. 10, 2019

(54) FIELD DEVICE MANAGEMENT SYSTEM

(71) Applicant: YOKOGAWA ELECTRIC CORPORATION, Musashino-shi, Tokyo (JP)

(72) Inventor: Satoru Ochiai, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 540 days.

(21) Appl. No.: 14/728,146

(22) Filed: Jun. 2, 2015

(65) Prior Publication Data

US 2015/0355631 A1 Dec. 10, 2015

(30) Foreign Application Priority Data

Jun. 4, 2014 (JP) ................................. 2014-115698

(51) Int. Cl.
*G06F 19/00* (2018.01)
*G05B 19/418* (2006.01)
*G05B 19/042* (2006.01)

(52) U.S. Cl.
CPC ......... *G05B 19/418* (2013.01); *G05B 19/042* (2013.01); *G05B 19/4185* (2013.01);
(Continued)

(58) Field of Classification Search
USPC ........................................................ 700/190
See application file for complete search history.

(56) References Cited

U.S. PATENT DOCUMENTS

2005/0066104 A1* 3/2005 Train ................. G05B 19/4186
710/305
2006/0031577 A1* 2/2006 Peluso ............... G05B 19/4185
709/243
(Continued)

FOREIGN PATENT DOCUMENTS

EP 2469367 A2 6/2012
EP 2575116 A2 4/2013
JP 2013-077197 A 4/2013

OTHER PUBLICATIONS

Communication dated Oct. 22, 2015 issued by European Patent Office in counterpart European Patent Application No. 15170104.2.

*Primary Examiner* — Md Azad
(74) *Attorney, Agent, or Firm* — Sughrue Mion, PLLC (57) ABSTRACT

A field device management system include a plurality of field devices equipped in a plant, one or more host devices equipped at a place distant from the plant and configured to connect to the field devices via a first network, and a terminal apparatus configured to connect to the field devices via a second network and to connect to the host devices via a third network. The terminal apparatus includes a first communication interface module configured to perform field communication with the field devices via the second network, a second communication interface module configured to perform near field communication with the host devices via the third network, and a controller that, when updating data of any one of the field devices, performs communication with the host devices through the second communication interface module, and receives update permission information from the host device through the second communication interface module.

16 Claims, 9 Drawing Sheets

(52) U.S. Cl.
CPC .............. *G05B 2219/23406* (2013.01); *G05B 2219/25068* (2013.01); *G05B 2219/31103* (2013.01); *G05B 2219/31121* (2013.01); *G05B 2219/31197* (2013.01); *G05B 2219/31484* (2013.01); *Y02P 90/14* (2015.11); *Y02P 90/18* (2015.11)

(56) References Cited

U.S. PATENT DOCUMENTS

| | | | |
|---|---|---|---|
| 2009/0065578 A1* | 3/2009 | Peterson | G05B 19/048 235/382 |
| 2010/0145476 A1 | 6/2010 | Junk et al. | |
| 2013/0024542 A1 | 1/2013 | Keller et al. | |
| 2013/0083694 A1* | 4/2013 | Jinguu | G05B 19/0421 370/254 |

* cited by examiner

TERMINAL : HHT21
TARGET DEVICE : YTA110
PARAMETER : TB>TAG
DATA : ABC
SETTING VALUE : DEF

TARGET DEVICE : YTA110
PARAMETER : TB>TAG
DATA : DEF

| PERMISSION (OK) | REJECTION (NG) | | COMMENT INPUT OR FILE NAME TO BE TRANSMITTED | | | | | TRANSMISSION |

| No | DATE TIME | TERMINAL NAME | TARGET DEVICE | PARAMETER | PROCEDURE | DATA/SETTING VALUE | OLD VALUE | STATUS |
|---|---|---|---|---|---|---|---|---|
| 000310 | 2014-03-10 15:20:00 | HHT12 | YTA110 | TB>TAG | Judge | DEF | ABC | PERMISSION REQUEST |
| 000311 | 2014-03-10 15:20:20 | HOST21 | HHT12 | CONFIRM | Send | OK | - | PERMISSION |
| 000312 | 2014-03-10 15:20:30 | HHT21 | YTA110 | TB>TAG | Write | DEF | ABC | WRITING |
| 000313 | 2014-03-10 15:20:40 | HOST21 | YTA110 | TB>TAG | Read | DEF | - | READING (AUTOMATIC COMPARISON) |
| ...... | | | | | | | | |

FIG. 6

TERMINAL : HHT21
TARGET DEVICE : YTA110
PARAMETER:TB>Simulate Value
DATA:50%
SETTING VALUE:0%

TARGET DEVICE : YTA110
PARAMETER:TB:TB>Simulate Value
DATA:1.5%

| PERMISSION (OK) | REJECTION (NG) | COMMENT INPUT | | | | | | TRANSMISSION |
|---|---|---|---|---|---|---|---|---|

| No | DATE TIME | TERMINAL NAME | TARGET DEVICE | PARAMETER | PROCEDURE | DATA/SETTING VALUE | OLD VALUE | STATUS |
|---|---|---|---|---|---|---|---|---|
| 000510 | 2014-04-10 15:20:00 | HHT12 | YTA110 | TB>SIMULATE VALUE | Write | 0 | 50 | WRITING |
| 000510 | 2014-04-10 15:20:20 | HOST21 | YTA110 | TB>PRIMARY VALUE | Read | 2.5 | 50 | READING |
| 000510 | 2014-04-10 15:20:20 | HOST21 | YTA110 | TB>PRIMARY VALUE | Read | 12.5 | 2.5 | READING |
| 000510 | 2014-04-10 15:20:40 | HOST21 | YTA110 | TB>PRIMARY VALUE | Read | 8.0 | 12.5 | READING |
| 000510 | 2014-04-10 15:20:50 | HOST21 | YTA110 | TB>PRIMARY VALUE | Read | 3.0 | 5.0 | READING |
| 000510 | 2014-04-10 15:21:00 | HHT21 | YTA110 | TB>PRIMARY VALUE | Read | 1.5 | 3.0 | READING |
| 000510 | 2014-04-10 15:21:10 | HHT21 | YTA110 | TB>SELF CHECK | Read | GOOD | GOOD | READING |
| 000510 | 2014-04-10 15:21:20 | HOST21 | YTA110 | TB>Alarm1 | Read | OFF | ON | READING |
| 000510 | 2014-04-10 15:21:30 | HOST21 | YTA110 | TB>Alarm2 | Read | ON | OFF | READING |

| TERMINAL: | |
|---|---|
| TARGET DEVICE: | |

| TARGET DEVICE : YTA110 |
|---|
| PARAMETER::TB>Simulate Value |
| DATA:1.5% |
| SETTING VALUE:0% |

| PERMISSION (OK) | REJECTION (NG) | COMMENT INPUT |
|---|---|---|

TRANSMISSION

| No | DATE TIME | TERMINAL NAME | TARGET DEVICE | PARAMETER | PROCEDURE | DATA/SETTING VALUE | OLD VALUE | STATUS |
|---|---|---|---|---|---|---|---|---|
| 000610 | 2014-06-10 15:20:00 | HHT12 | HOST21 | JOIN | Send | YTA110 | — | CONNECTION |
| 000611 | 2014-06-10 15:20:20 | HOST21 | YTA110 | TB>SENDOE TYPE | Write | TCK | PT10D | WRITING |
| 000612 | 2014-06-10 15:20:30 | HOST21 | HHT12 | REPORT | Send | TB>Sensro Type:TCK | — | PUBLICATION(AUTOMATIC) |
| 000613 | 2014-06-10 15:20:40 | HHT21 | HOST21 | ACK | Send | TB>Sensro Type:TCK | — | RECOGNITION(AUTOMATIC) |
| ......... | | | | | | | | |

FIG. 9

FIELD DEVICE MANAGEMENT SYSTEM

CROSS-REFERENCE TO RELATED APPLICATION

The present application claims priority from Japanese Patent Application No. 2014-115698 filed on Jun. 4, 2014, the entire content of which is incorporated herein by reference.

BACKGROUND

The present invention relates to a field device management system suitable for process control of a plant and the like.

For example, a device control apparatus (hereinafter, referred to as 'host device') configured to perform a control such as setting, adjustment and the like for a field device is used in process control of a chemical plant and the like. The field device includes a pressure transmitter, a temperature transmitter, a flow meter, a valve positioner and the like.

The host device includes a distributed control system (DCS), a personal computer (PC), a portable terminal and the like, and is connected to the field device via a field bus to perform digital communication. When executing the device control, the host device executes various control functions to control the field device. The control functions include a setting function, an adjustment function and the like.

Figure 9:
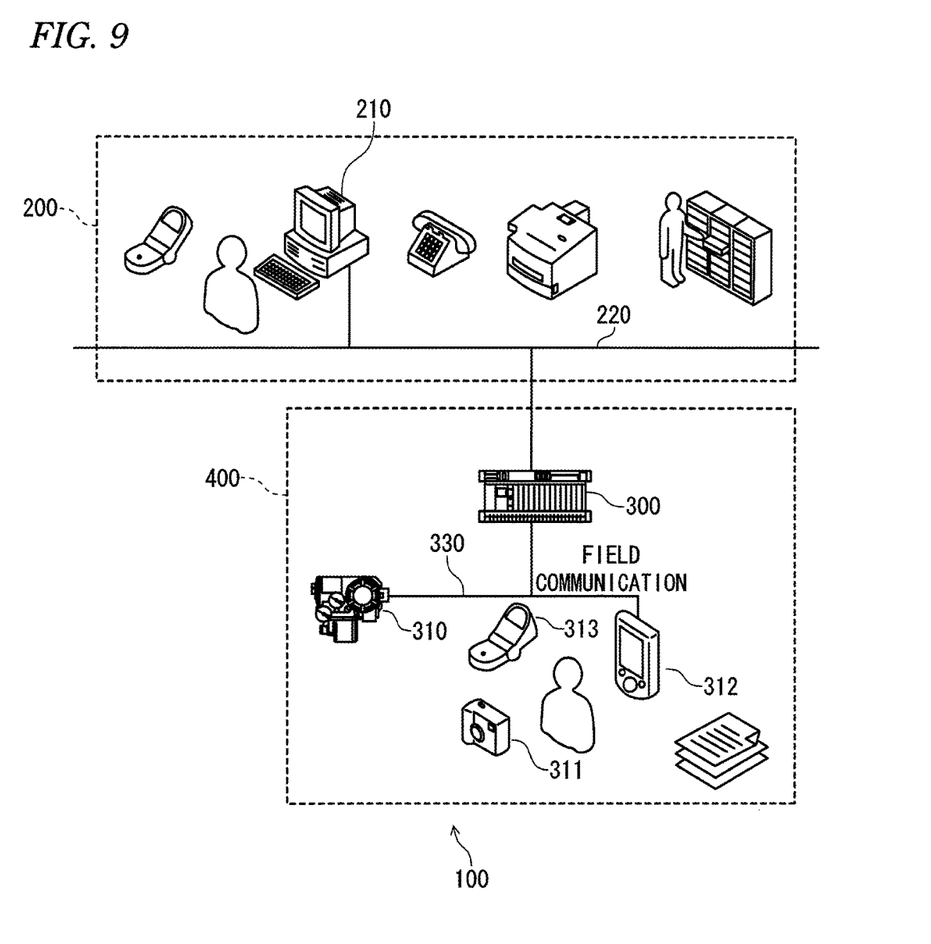
FIG. 9 illustrates an example of a system configuration of a related-art field device management system.

FIG. 9 illustrates an example of a field device management system 100. In a plant 400, a plurality of field devices 310 is equipped. The field device 310 is connected to a relay apparatus 300 through field communication of a field bus 330 and the like, and is connected to a host device 210 equipped in an instrument panel room 200 via a network 220 such as a local area network (LAN).

When a worker in the site of the plant 400 (which is hereinafter referred as "worker") performs an operation such as a data monitoring, a setting change, maintenance and the like with respect to the field device 310, the worker is required to have a thorough knowledge of the operation of the field device 310. There is a recognition system, depending on factories, so that only a worker having a predetermined skill is allowed to perform the operation. Also, when a new field device 310 is introduced, parameters are different, for example, so that it is difficult to be immediately familiar with the new field device. For this reason, the worker carries a large amount of technical materials or a camera 311 for recording or receives an instruction of an operator in the instrument panel room 200 by using a portable phone 313, a transceiver and the like in a specific area, thereby performing the operation.

When the setting of the field device 310, with which the worker is unfamiliar because the field device 310 has been newly introduced, is changed using a terminal apparatus such as a hand held terminal (HHT) 312 and the like, a false setting may be made because of the unfamiliar operation. When a setting method or setting parameter is unclear, the worker may request the operator, who is in the instrument panel room 200, to confirm operation contents by using the portable phone 313 or transceiver, or may inform the operator of a progressing status as regards an operation in a dangerous field.

When the worker handles the unfamiliar field device 310, the worker feels great fatigued due to the tension such as uneasiness and anxiety. If the setting mistake occurs, it influences the entire process. Since the system includes the enormous parameters, it is difficult to immediately find out a problem. Also, a problem that occurs only in a specific operation may not be perceived until an operation starts. That is, the setting mistake of the parameter is found by interpreting a memo, a photograph, a change content log and the like in which the setting change is described, so that the enormous analysis operation may be performed.

For example, Patent Document 1 discloses a technology relating to a field device setting method and a field device setting system capable of reducing an operation load on setting processing.

[Patent Document 1] Japanese Patent Application Publication No. 2013-77197A

In recent years, a high-performance terminal apparatus has been used as the HHT 312, in many cases. Since the HHT 312 is configured to record the enormous information, it also takes much time to detect a problematic part. In the related art, when the worker changes a setting of the field device, the host device 210 generally cannot perceive the setting change and a setting value may not be compatible with the host device 210. Also, although the status information of which change is recognized may be provided through a communication protocol, it is not clear which parameter has been changed. In this case, the host device 210 should again read the information of the target field device and synchronize the data. Thereby, even though the parameter is slightly changed, the increase in the load of the industrial low-speed communication (the field communication 330) is caused and the time and labor are consumed.

Also, when a problem occurs in the site, a photograph may be taken. However, when photographs of the enormous field devices 310 are taken, it may be difficult to determine which photograph corresponds to the field device 310 when organizing the data later. In this case, a name plate is checked or a file name is linked. However, an input mistake is likely to occur.

SUMMARY

Exemplary embodiments of the present invention provide a field device management system capable of reducing a load of a worker and maintaining data in cooperation with a host device when changing a setting of a field device.

A field device management system according to an exemplary embodiment of the invention comprises:
a plurality of field devices equipped in a plant;
one or more host devices equipped at a place distant from the plant and configured to connect to the field devices via a first network; and
a terminal apparatus configured to connect to the field devices via a second network and to connect to the host devices via a third network,
wherein the terminal apparatus comprises:
a first communication interface module configured to perform field communication with the field devices via the second network,
a second communication interface module configured to perform near field communication with the host devices via the third network, and
a controller that, when updating data of any one of the field devices, performs communication with the host devices through the second communication interface module, receives update permission information from the host device through the second communication interface module and performs data update of the field device through the first communication interface module.

The controller may transmit an error message to the host device through the second communication interface module when an error occurs during the data update.

The terminal apparatus may further comprise a display module, and when the terminal apparatus receives a message from the host device through the second communication interface module, the controller may display the message on the display module.

When the data update has been performed, the controller may transmit history information of the data update to the host devices through the second communication interface module, and the host device which has received the history information via the third network may update data thereof based on the history information to synchronize internal data of the terminal apparatus and the host device.

When a state is made in which the terminal apparatus can access the field devices through the first communication interface module, the controller may notify the host devices that the terminal apparatus is connected to a specific loop, through the second communication interface module.

The terminal apparatus may further comprise a storage module, and when the host device updates the data, the controller may receive history information of the data update from the host device via the third network, and update data of the storage module on the basis of the received history information to synchronize internal data of the terminal apparatus and the host device.

According to the present invention, it is possible to provide the field device management system capable of reducing the load of the worker and maintaining data in cooperation with the host device when changing a setting of the field device.

DETAILED DESCRIPTION (Configuration of Exemplary Embodiment)

Hereinafter, exemplary embodiments of the present invention will be described in detail with reference to the accompanying drawings. In the meantime, the same elements are denoted with the same reference numerals over the whole description of the exemplary embodiment.

Figure 1:
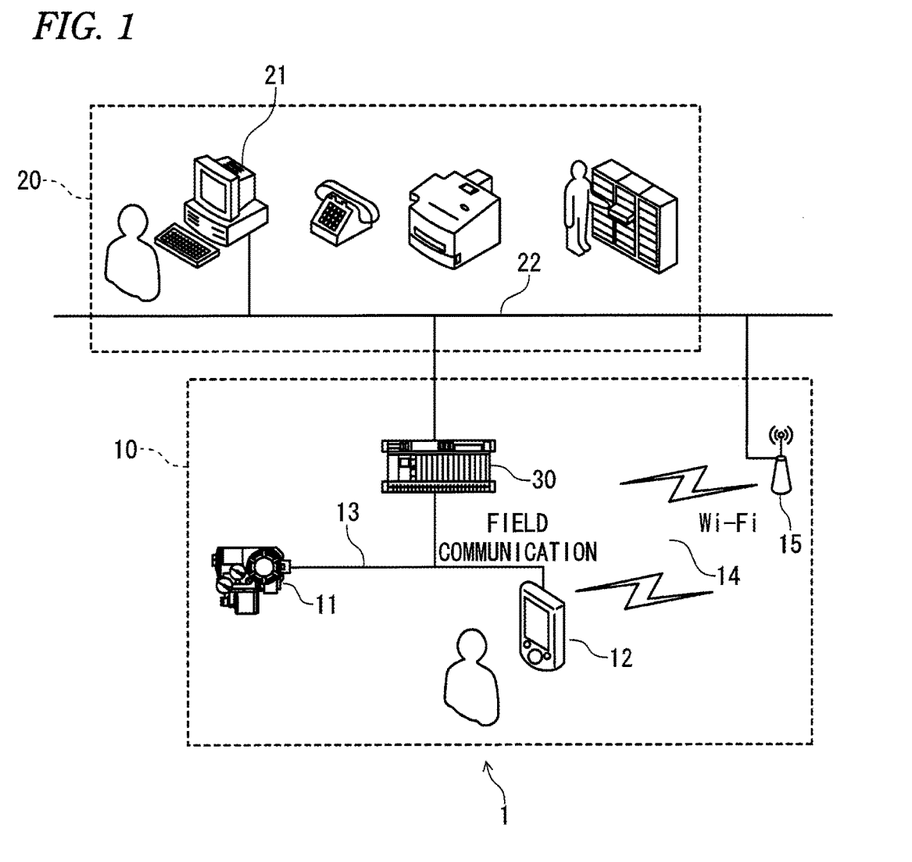
FIG. 1 illustrates an example of a field device management system according to an exemplary embodiment of the present invention.

Referring to FIG. 1, a field device management system 1 of this exemplary embodiment includes a plurality of field devices 11 such as a valve positioner equipped in a plant 10, and one or more host devices 21 such as a PC, which are equipped in a place distant from the plant 10 and connected to the field devices 11 via a relay apparatus 30 and a network 22 (first network) such as a LAN.

An HHT (terminal apparatus) 12 is connected to a loop of the field device 11 via a dedicated communication network for industrial meter gauge (including Brain, HARD, Fieldbus, Profibus and the like; hereinafter, collectively referred to as field communication 13 (second network)). The HHT 12 is further connected to a Wi-Fi base unit 15 (access point) by a Wi-Fi (registered trademark) network 14 (third network) and to the host device 21 via the network 22. When updating data in correspondence to a setting change of one of the field devices 11, the HHT 12 performs communication with the host device 21 via the Wi-Fi base unit 15 and the network 22 such as LAN, receives update permission information from the host device 21 via the network 22 and the Wi-Fi base unit 15 and updates the data.

Figure 2:
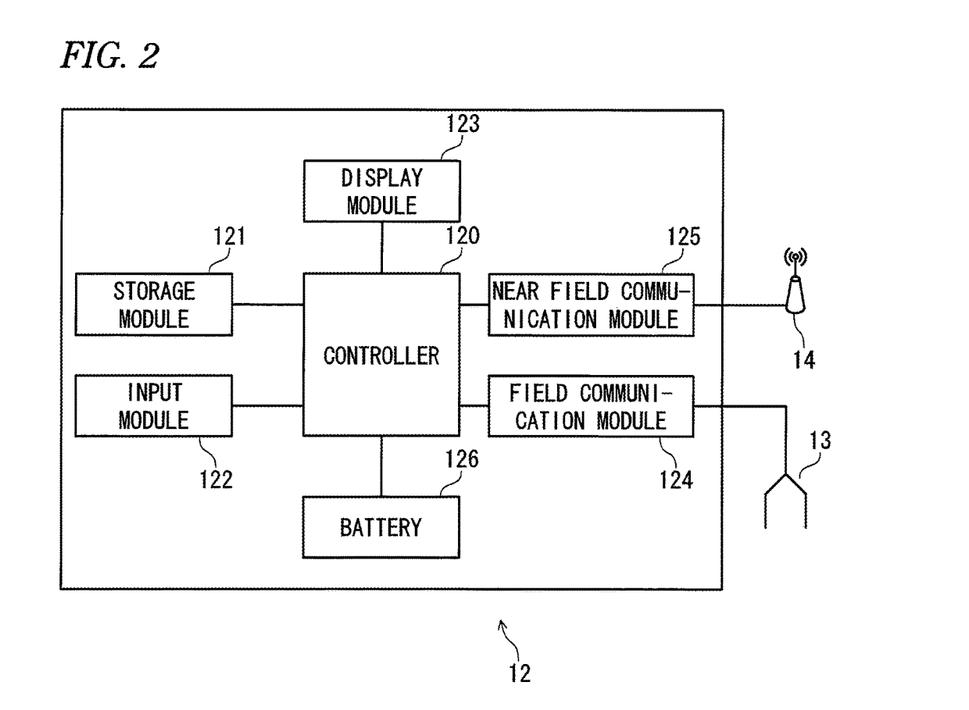
FIG. 2 is a block diagram showing an internal configuration of a terminal apparatus shown in FIG. 1.

An internal configuration of the HHT 12 is shown in FIG. 2. The HHT 12 has a controller 120, a storage module 121, an input module 122, a display module 123, a field communication module 124 (first communication interface), a near field communication module 125 (second communication interface), and a battery 126.

The storage module 121 has a ROM, and a RAM or EEPROM mounted thereon. In the ROM, a program that is executed by the controller 120 is stored. In the RAM or EEPROM, data that is generated during execution of the program is stored. In the meantime, the ROM and RAM may be mounted on the controller 120.

The controller 120 has a microprocessor embedded therein, and is configured to receive power fed from the battery 126 based on a power supply ON operation from the input module 122 to start. The controller 120 is configured to transmit generated display information to the display module 123 and to select an operation that a worker having recognized the display information expects. The display module 123 has a liquid crystal display (LCD) or organic electro luminescence (EL) as a display device, and is configured to display a message transmitted from the host device 21, and the like.

The field communication module 124 has a field bus communication module embedded therein and is configured to serve as a communication interface when the HHT 12 is connected to the field communication 13 and performs data exchange with the field device 11. The near field communication module 125 is configured to perform wireless communication with the Wi-Fi base unit 15, based on the Wi-Fi (registered trademark), for example. The near field communication module 125 has a Wi-Fi communication module embedded therein, and is connected to the host device 21 equipped in the instrument panel room 20 through the network 22 such as the LAN by the Wi-Fi network 14 established between the near field communication module and the Wi-Fi base unit 15 equipped at any place in the plane 10, thereby performing communication on the basis of the protocol such as Transmission Control Protocol/Internet Protocol (TCP/IP).

When updating the data of any one of the field devices 11, the controller 120 performs communication with the host device 21 and receives the update permission information from the host device 21 through the Wi-Fi communication network 14 established between the near field communication module 125 and the Wi-Fi base unit 15 and the network 22 such as LAN, and updates the data through the field communication module 124 and the field communication 13. When an error occurs during the data update, the controller 120 may transmit an error message to the host device 21 via the Wi-Fi network 14. Also, when a message is received from the host device 21 via the Wi-Fi network 14, the controller 120 may display the message on the display module 123.

Also, when the controller 120 updates the data of the field device 11, the controller 120 transmits history information of the data update to the host device 21 via the Wi-Fi network 14, and the host device 21 that has received the history information updates data of the host device on the basis of the history information to synchronize internal data of the host device 21. Also, when the host device 21 updates the data, the controller 120 receives the history information of the data update from the host device 21 via the Wi-Fi network 14 and updates the data of the storage module 121 on the basis of the received history information to synchronize the internal data of the HHT 12.

Also, when the controller 120 becomes a state that the HHT 12 can access the field device 11 through the field communication module 124, the controller 120 may notify the host device 21 that connection to a specific loop has been made, through the Wi-Fi network 14.

(Operations of Exemplary Embodiment)

Figure 3:
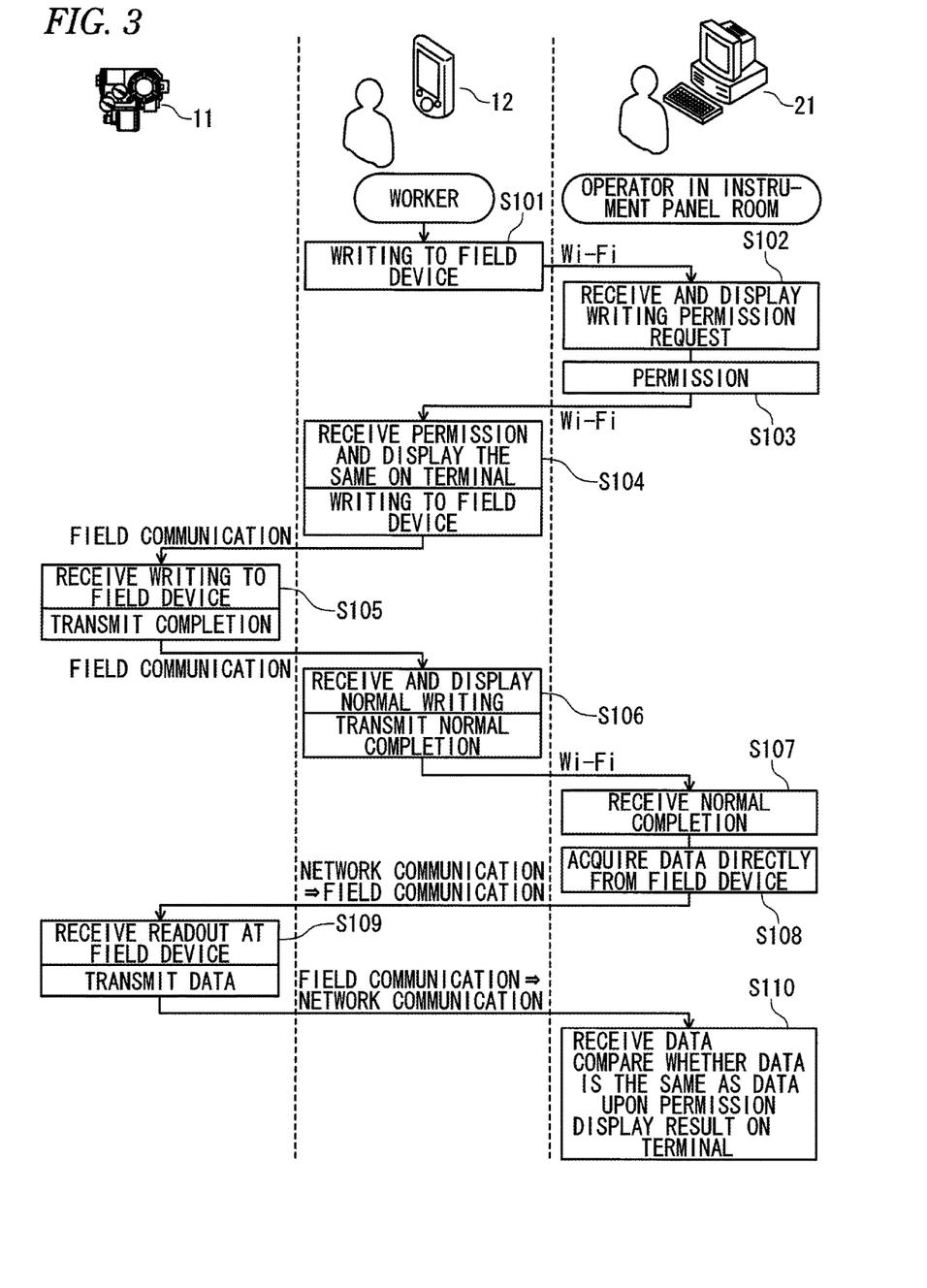
FIG. 3 is an operation sequence diagram showing a flow of change permission processing of the field device management system according to the exemplary embodiment of the present invention.

In the below, operations of the field device management system 1 of the exemplary embodiment are described in detail with reference to sequence diagrams of FIG. 3 and thereafter.

First, data change permission processing is described with reference to a sequence diagram of FIG. 3. That is, operations, which are performed in a case where when a worker in the plant 10 writes setting data to the field device 11, the worker receives a permission from an operator in the instrument panel room 20 and then actually writes the setting data, are described.

Figure 4:
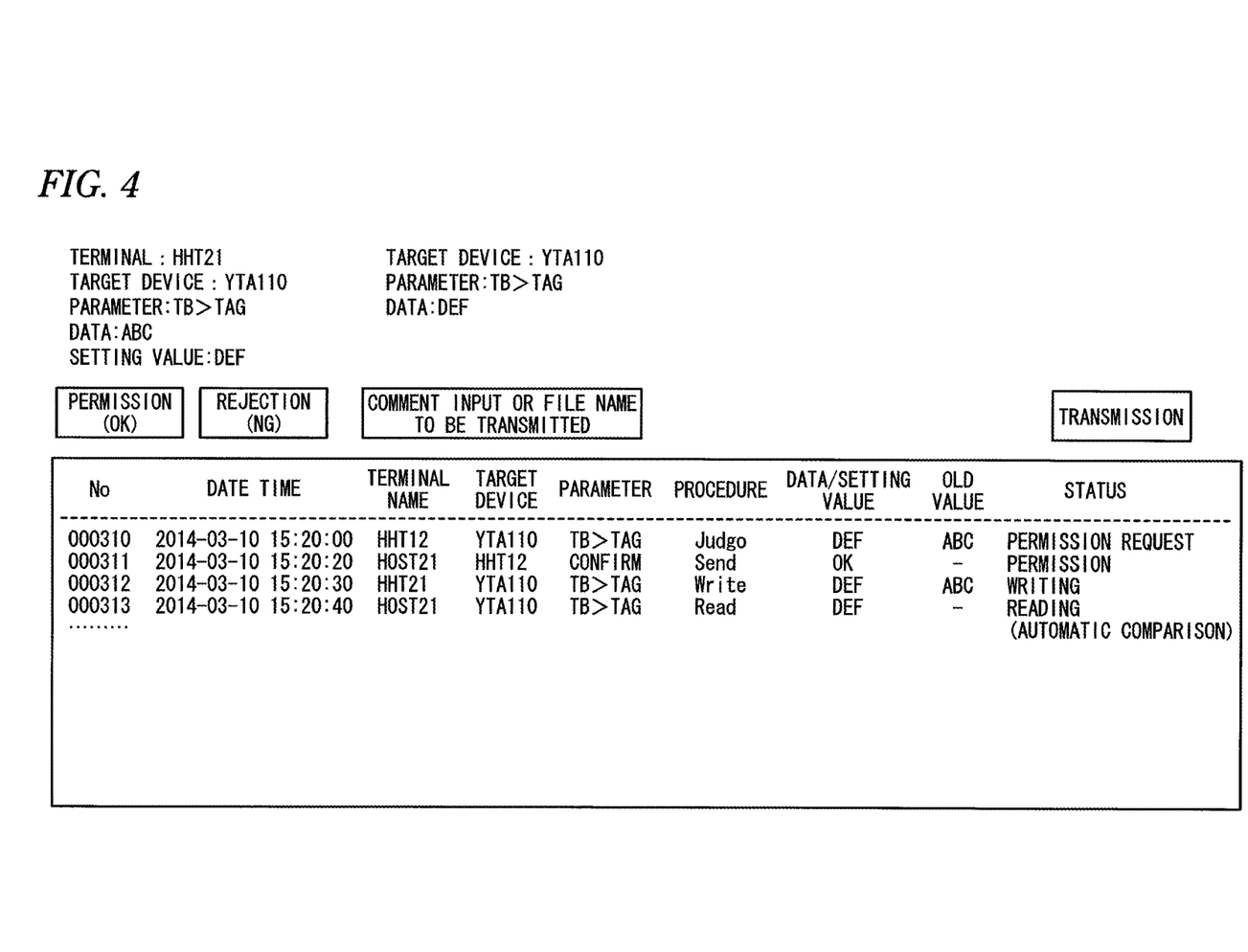
FIG. 4 illustrates an example of a screen configuration of a permission screen that is displayed on a host device of FIG. 1.

When the worker rewrites a specific parameter by using the field communication 13 (step S101), the HHT 12 transmits a confirmation message (request for writing permission) to the host device 21 in the instrument panel room 20 through the Wi-Fi network 14. When the host device 21 receives the confirmation message, the host device 21 displays a permission request message (an example of a screen configuration is shown in FIG. 4) (step S102). In the permission request message, a permission button, a rejection button and the like are displayed in some areas. In the meantime, the permission request message will be described in detail later.

When the operator in the instrument panel room 20 confirms and checks contents of the confirmation message and permits the same, the operator in the instrument panel room 20 presses the permission button (step S103). A result of the permission is received with the HHT 12 carried by the worker via the Wi-Fi network 14. The HHT 12 which has received the permission displays a permission completion message on the display module 123 (step S104) and writes a new permitted setting value to the field device 11 through the field communication 13 (step S105). On the other hand, when the rejection button is pressed and the permission is thus rejected, the HHT 12 cannot write a new setting value to the field device 11.

When the writing of the new setting value is completed, the HHT 12 notifies the host device 21 that the writing has been normally over, via the Wi-Fi network 14 (step S106).

When the host device 21 receives the notification of the normal completion (step S107), the host device acquires data directly from the target field device 11 so as to check whether the setting change has been correctly executed for the target field device 11, through the network 22, the relay apparatus 30 and the field communication 13 (step S108). When the field device 11 transmits data to the host device 21 based on the request from the host device 21 (step S109), the host device 21 determines whether the read setting value is the previously permitted setting value and displays a message such as a completion of the setting change on a terminal of the host device 21 (step S110).

In the meantime, when the writing to the field device 11 fails, an error message is displayed on the display module 123 of the HHT 12, and an error message is displayed on the terminal of the host device 21, too, via the network 14. Also, since a memo, a photograph, a document and the like can be transmitted from the host device 21 to the HHT 12 via the Wi-Fi network 14, a solution for the writing error or an instruction how to solve the writing error can be displayed on the screen.

Here, the permission request message is supplementarily described. The host device 21 is configured to generate a terminal name, a target device name, a parameter name, a data name, a setting value and the like, based on the information transmitted from the HHT 12 via the Wi-Fi network 14, and display them in a left-upper area of the permission request message. In FIG. 4, the permission (OK) button and the rejection (NG) button are validated only when a request is transmitted from the HHT 12, and are usually under a gray out state. A button 'comment input or file name to be transmitted' is used to transmit a comment or related material to the HHT 12. A right-upper area of the screen is an area that is used when the host device 21 performs the communication with the field device 11 via the field communication, and the host device 21 generates a device name, a parameter name, data and the like and displays them in this area (not shown). In this area, by setting a device name to be requested and a parameter name and pressing a transmission button, the communication starts between the host device 21 and the requested field device 11. A communication log is displayed in a box of a lower area of the screen. That is, items such as a number (No), date, time, a terminal name, a target device name (field device name to be accessed), a parameter name, a procedure (procedure content to be taken), data/setting value, a previous value (used for writing), a status and the like are displayed. In the item of "procedure", communication objects such as Read (reading a parameter of a field device), Write (writing a parameter of a field device), Send (information exchange with a terminal and a host device) and Judge (permission request from terminal) are displayed.

In the item of "parameter", 'block (belonging middle classification)>name' is basically described. However, as regards the communication between the host device 21 and the HHT 12, the symbol '>' is not used and a content is described. The content includes 'CONFIRM (a judging result in response to the permission request is transmitted to the HHT 12)', 'Join (communication with a field device starts)', 'REPORT (information indicating that the host device 21 has performed the writing to the field device 11 is transmitted to the HHT 12), 'ACK (notification indicating that the HHT 12 receives and updates a REPORT from the host device 21)', and the like. Also, regarding the item of "status", an operation is described with being simplified. '(Automatic)' is described when the host device 21 or terminals have automatically started communication.

As described above, the field device management system 1 of this exemplary embodiment has the function of requesting the operator of the host device 21 to permit the setting change through the Wi-Fi network 14 when the worker operates the HHT 12 to write the data to the field device 11. Therefore, although there is a possibility that the worker will write a wrong parameter due to an operation mistake or misunderstanding upon execution of the rewriting of the parameter, the worker can transmit the change content to the host device 21 through the Wi-Fi network 14 before the writing and can receive the determination (permission operation) of a separate person. As a result, a plurality of peoples can perform the confirmation operation, so that it is possible to prevent the false data from being written.

Also, according to the field device management system 1 of this exemplary embodiment, the host device can receive the information indicating whether the data writing has been normally executed. Therefore, it is possible to prevent a careless mistake because the information can be shared with the operator in the instrument panel room 20 even though the worker mistakes that the data has been normally written. Further, there is a possibility that the control loop is changed due to the change of the target field device 11, so that the field device 11, to which a separate worker corresponds, may be influenced. Regarding this, the structure capable of issuing the permission in the instrument panel room 20 is established, so that the writing can be held back until all of the permissions for the changes of the plurality of field devices 11 are made or the wiring sequence (permission sequence) to the respective field devices 11 can be controlled.

Also, when a writing error to the field device 11 occurs, it is difficult for the worker to find out the reason that the writing cannot be made. According to the field device management system 1 of this exemplary embodiment, when a writing error occurs, the error message is transmitted to the host device 21, too, through the Wi-Fi network 14. Therefore, the operator in the instrument panel room 20 can refer to a variety of references or have a talk with a knowledgeable person in a support center of the manufacturer (it is difficult for the worker to directly perform communication with the support center) to deduce a variety of solutions, so that it is possible to promptly find out a way of dealing with the error.

Also, according to the field device management system 1 of this exemplary embodiment, when a solution is found out, a message can be transmitted from the host device 21 to the HHT 12 through the Wi-Fi network 14 and the information can be displayed on the HHT 12. Therefore, it is possible to transmit a sequence of the solutions, a related material, a photograph and the like, for example, and the worker can clearly check the instructions displayed on the HHT 12.

Figure 5:
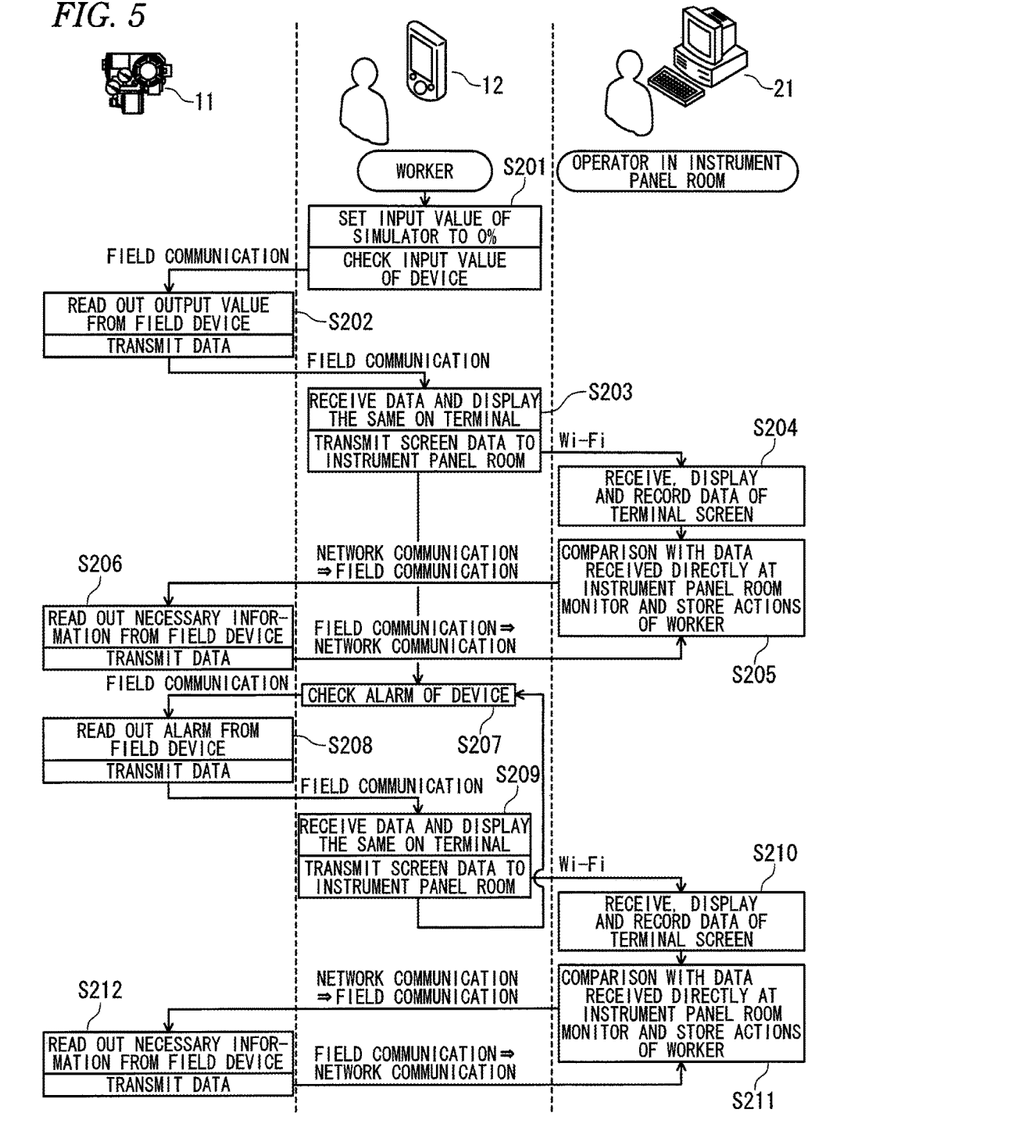
FIG. 5 is an operation sequence diagram showing a flow of action monitoring processing of a worker of the field device management system according to the exemplary embodiment of the present invention.

In the below, operations, which are performed when the operation content performed for the field device 11 by the field operator is also shared with the operator in the instrument panel room 20 in real time, are described with reference to a sequence diagram of FIG. 5. Here, an operation where the worker in the plant 10 checks an output value of the field device 11 by using a simulator or checks how an alarm of the field device 11 changes is exemplified.

The worker first connects the simulator to the field device 11 and makes setting for the simulator so that an input value can be varied. For example, the worker sets an input value becoming an output of 0%, and checks an output value by using the HHT 12 (step S201). When the field device 11 reads out a requested parameter and transmits the same to the HHT 12 (step S202), the HHT 12 displays the received parameter on the display module 123. Then, the HHT 12 transmits the received screen or actually communicated data to the host device 21 in the instrument panel room 20 through the Wi-Fi communication (step S203).

The host device 21 displays the screen of the HHT 12 and the data of the communication parameter which is obtained with the operation on the terminal of the host device 21, on the screen and writes the same to the embedded memory, as a log (steps S204 to S206). Then, the host device 21 checks whether an alarm has occurred with respect to the field device 11 through the same sequence (step S207). Here, when it is necessary to read a plurality of parameters, the data acquired from the HHT 12 is sequentially checked (steps S208 to S212). The parameters are displayed on the terminal (not shown) of the host device 21, including the sequence operated on the HHT 12, and are recorded, as a log, in the memory together with the data. The timing of the update of the log is a time when the HHT 12 automatically receives the communication, such as fixed time update data and an event of the alarm occurrence. At this time, the log is made upon the operation of the worker and the information is shared with the host device 21 in real time.

Thereby, the operator in the instrument panel room 20 can visually check the contents of the HHT 12 in the site, and the host device 21 can directly access the field device 11 via the network 22 and the field communication 13. Therefore, on one hand, it is possible to check the operation log of the HHT 12, and on the other hand, it is possible to directly check the statuses of the parameters of the field device 11 through a separate route. The host device 21 and the HHT 12 synchronize all the information, so that the worker and the operator in the instrument panel room can check an unmistakable operation and preserve all activities in the memory in cooperation with each other.

Figure 6:
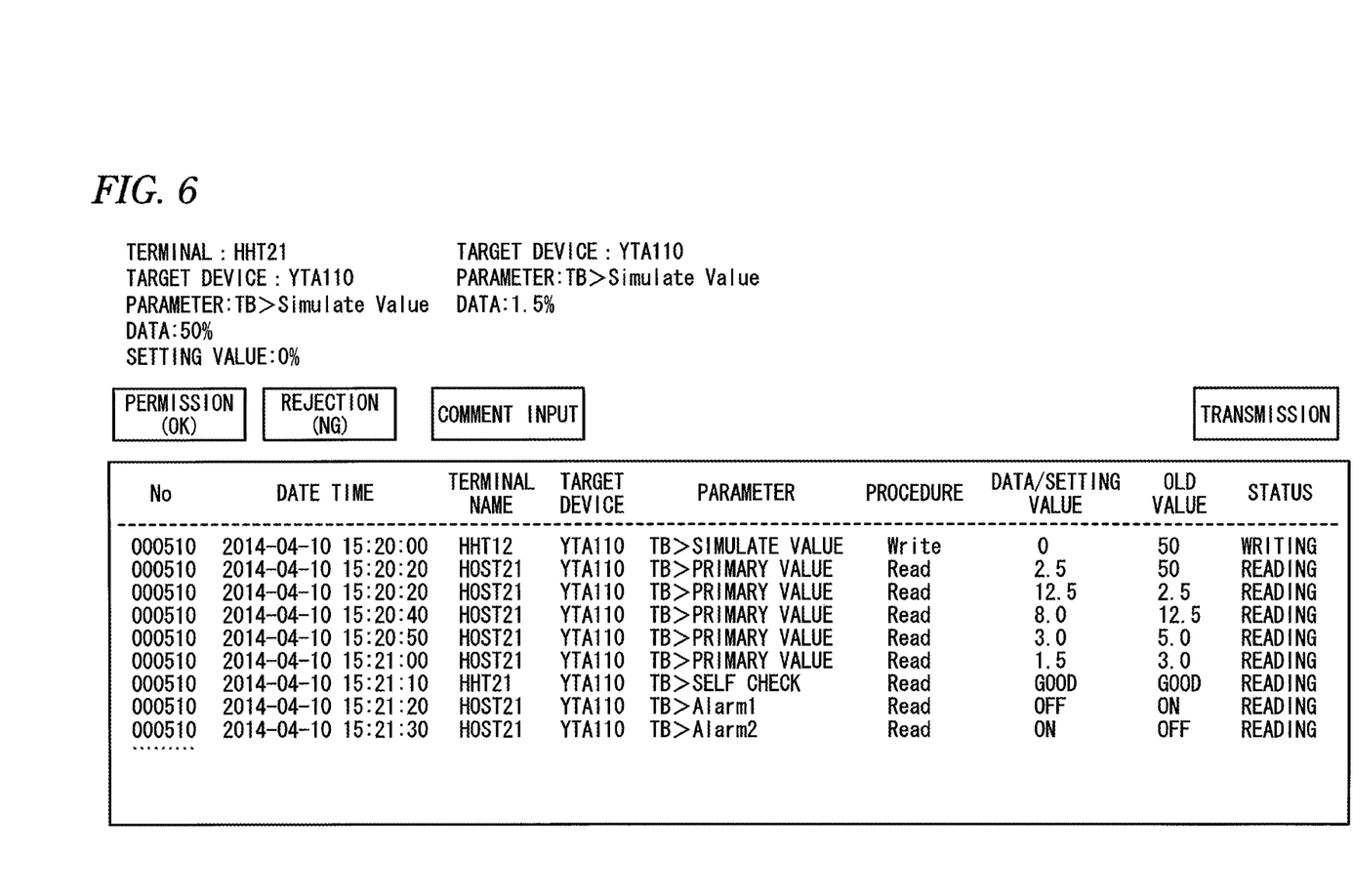
FIG. 6 illustrates an example of the screen configuration of the permission screen that is displayed on the host device of FIG. 1.

FIG. 6 illustrates an example of the permission request screen that is generated by the host device 21. According to the permission request screen, the worker sets the data to Simulate Value, and the operator in the instrument panel room 20 reads a value of Primary Value to see that the output of the field device 11 is gradually decreased. The worker checks an actual object of the field device 11, such as a valve, and finally the operator in the instrument panel room 20 reads relating parameters of Alarm 1 and Alarm 2 to confirm that the operation is normally performed.

According to the field device management system 1 of the exemplary embodiment, it is possible to provide the functions of transmitting and synchronizing the operation history such as the operation content on the HHT 12 and the accessed parameters with respect to the field device 11 to the host device 21 through the Wi-Fi network 14. In general, the HHT 12 has a compact design, and it is thus difficult to mount a large-capacity memory thereto. Therefore, even though the constant operation history can be remained, the old operation history is automatically erased in many cases. In contrast, according to the field device management system 1 of this exemplary embodiment, the operation history can be synchronized with the host device 21 in real time because of the connection to the Wi-Fi network 14.

For this reason, the operator in the instrument panel room 20 can easily check what the worker in the plant 10 is doing now and how the operation is progressed. For example, when checking the input/output of the field device 11, a simulator pseudoinput can be performed for the field device 11 and an output value read from the HHT 12 can be displayed on the host device 21 via the Wi-Fi network 14. Therefore, it is possible not only to check a result that the output value is correct but also to perceive the status from a time when the input is actually changed, in time-series manner, so that it is possible to check the actions of the worker in the plant 10 at the instrument panel room 20, too. In the meantime, the screen image and the communication information can be gathered in a database format, together with time, an operator name and the like.

Also, since the host device 21 can directly perform communication with the field device 11 by using the network 22, it is possible to compare the information of the HHT 12 of the worker in the plant 10 with the data acquired from the field device 11 by the host device 21 and to see the comparison result. Therefore, it is possible to acquire the extensive parameters, which are difficult to be operated with the HHT 12, and to thus monitor whether the operation is wrong, thereby making the integrated backup. From a standpoint of maintenance, it is necessary to preserve the operation history and the data log for a predetermined time period. This is implemented by making a database of the operation history and the data log, so that it is possible to provide both the real time property and the fullness as the log.

Figure 7:
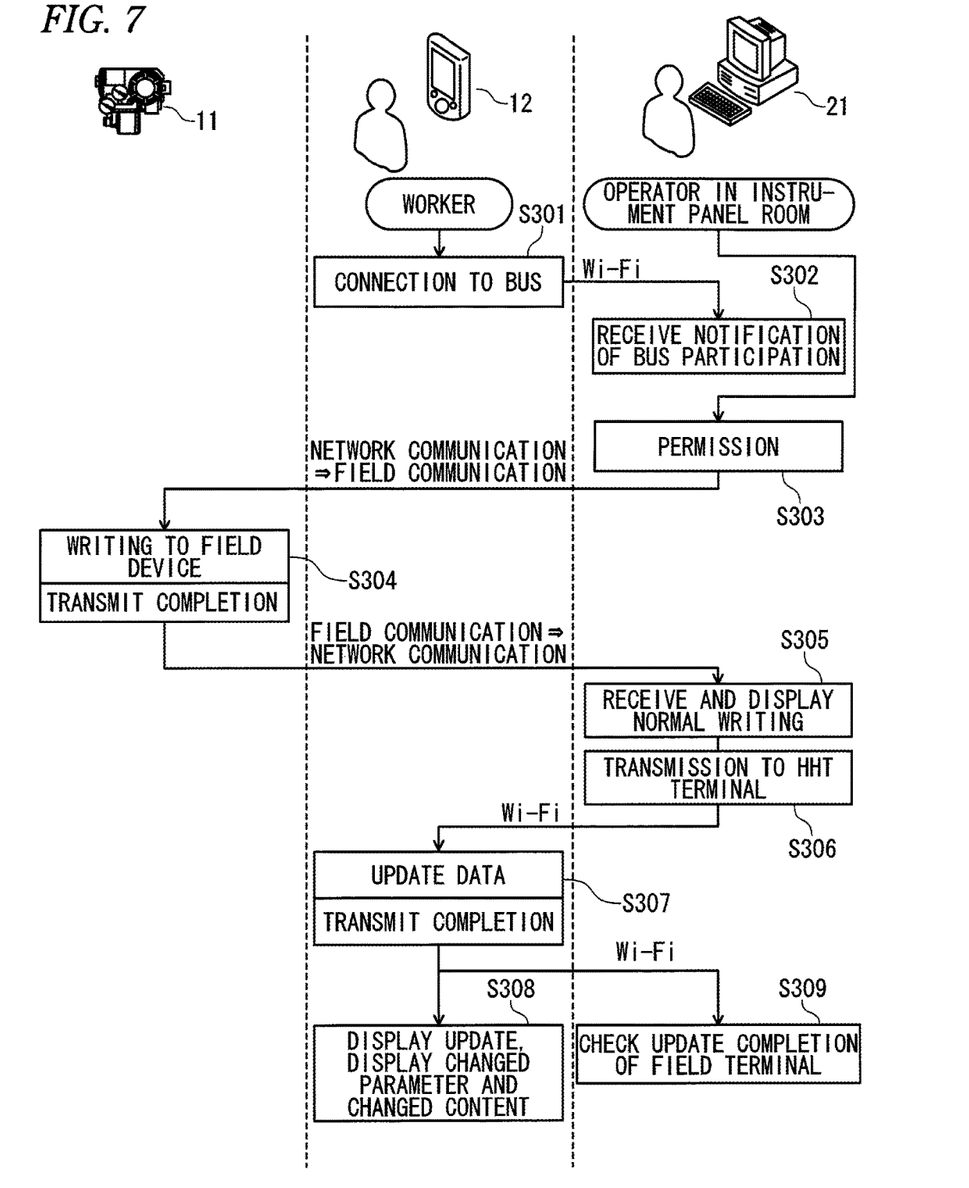
FIG. 7 is an operation sequence diagram showing a flow of synchronization processing of setting information of the field device management system according to the exemplary embodiment of the present invention.

Subsequently, operations, which are performed when the host device 21 synchronizes with the HHT 12 when the host device 21 updates the data of the field device 11, are described with reference to FIG. 7. Here, a method of synchronizing data of the parameters of the field device 11 when the worker connects the HHT 12 to a specific loop, i.e., a so-called multi-master state is thus made is described.

When the HHT 12 connects to a specific loop, the HHT 12 (controller 120) notifies the host device 21 that the HHT 12 takes part in the specific loop (connects to a bus), via the Wi-Fi network 14 (step S301). The host device 21 which has received the notification (step S302) writes data to the field device 11 in the specific loop (step S303). Here, when the writing is normally made, the notification indicating that the parameter of the field device 11 has been changed is transmitted to the HHT 12 via the Wi-Fi network 14 (steps S304 to S306).

Based on the information, the HHT 12 updates the parameter kept therein and changes the state of the field device 11 to update the same to the latest state without using the field communication 13 (step S307). Also for the worker, a message is displayed on the screen of the display module 123 of the HHT 12, and it is indicated that the rewriting has been made from the host device 21 and how any parameter has been changed (step S308). Finally, the operator in the instrument panel room 20 confirms on the terminal (not shown) that the update of the parameter in the site has been completed (step S309), and ends the processing.

In many cases, when the HHT 12 connects to the loop in which the field device 11 exists, this loop also connects to the dedicated host device 21 (master device) at the same time. Some protocols have a specification with which the HHT 12 can be connected as a secondary master. Therefore, when the plurality of host devices 21 is connected, the field device 11 can be accessed from any host device 21 and can change a specific parameter.

Figure 8:
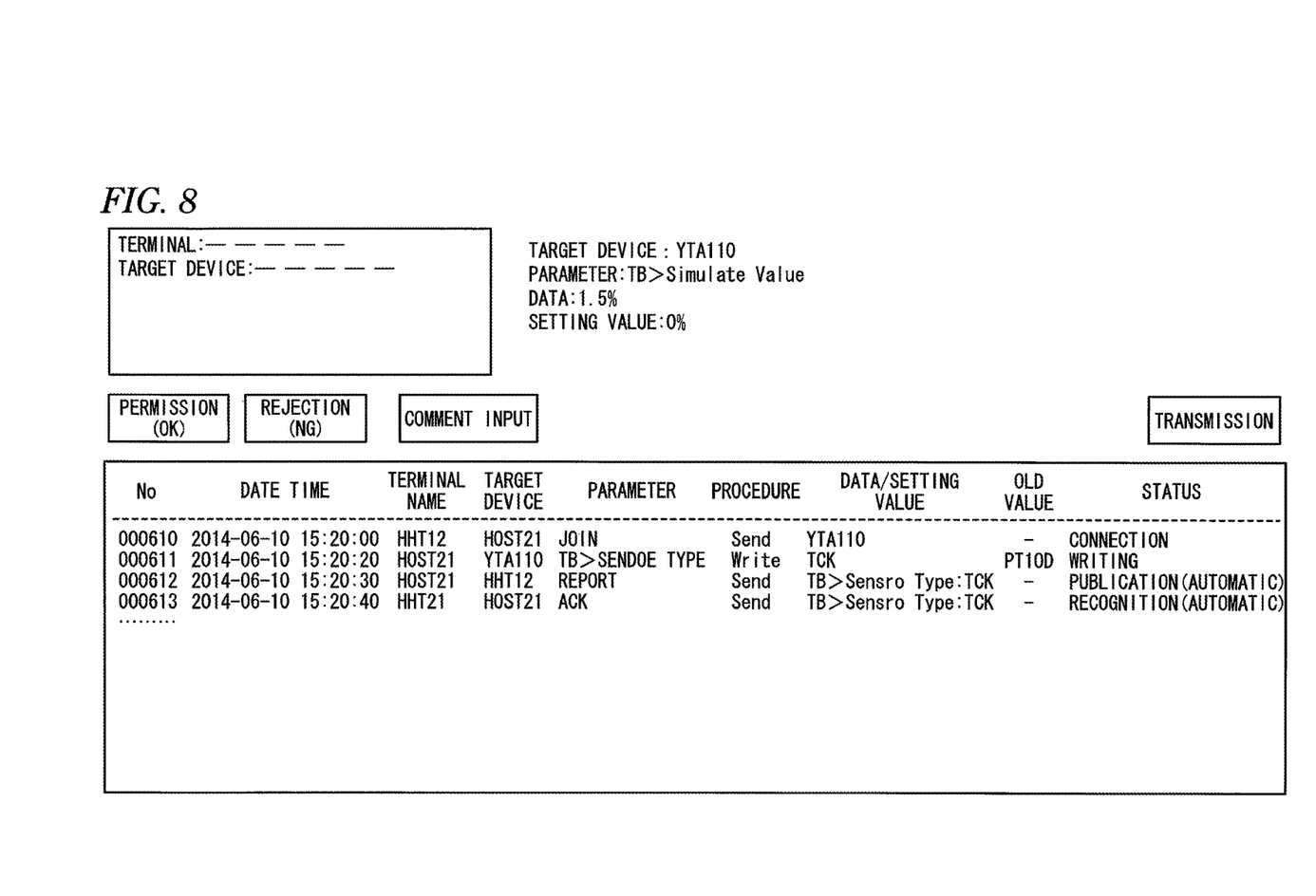
FIG. 8 illustrates an example of the screen configuration of the permission screen that is displayed on the host device of FIG. 1.

FIG. 8 illustrates an example of the permission request screen that is generated by the host device 21. When the information indicating that the HHT 12 is connected to a specific device is transmitted to the host device 21 via the Wi-Fi network 14, the host device can use a monitor screen and a log function. Here, since the writing is performed for the field device 11 from the host device 21, a report is transmitted to the terminal in the site (HHT 12) from the host device 21, and the information indicating that the database of the terminal in site has been updated is transmitted to the host device 21 from the terminal in the site.

The field device management system 1 of this exemplary embodiment has the function of capable of notifying the host device 21 that the HHT 12 is connected to the specific loop, via the Wi-Fi network 14, when the state is made in which the HHT 12 can access the field device 11 in the site. As a result, when the setting of the field device 11 is changed from the host device 21, it is possible to notify the secondary master of the setting change.

In the related art, it is not possible to know whether the setting has been changed. Also, even though the status information of the change occurrence can be recognized by the protocols, it is not possible to know which parameter has been changed. Therefore, it is necessary to re-read all the parameters from the field device 11. In particular, when the setting of the field device 11 is changed by the host device 21 during the editing on the HHT 12, the HHT 12 forcibly removes the editing contents, synchronizes the data and then again performs the editing. In contrast, according to the exemplary embodiment, the HHT 12 can receive the change information of the specific parameter from the host device 21 via the Wi-Fi network 14. Therefore, it is possible to rapidly update the information in the HHT 12, and to prevent the old information from being written by the synchronization of the internal data. To the contrary, since the information indicating the writing from the HHT 12 can be transmitted via the Wi-Fi network 14 to the host device 21, the host device 21 can also recognize the change of the specific parameter and rapidly update the database kept in the host device 21.

(Effects of Exemplary Embodiment)

As described above, according to the field device management system 1 of the exemplary embodiment, when the HHT 12 writes the data to the field device 11, it asks the manager and the like of the host device 21 to permit the setting change, via the Wi-Fi network 14. This structure is established, so that a plurality of persons can perform the check operation and it is possible to prevent the false data from being written, which improves the reliability of the system.

Also, the operation contents on the HHT 12 and the contents of the accessed parameters (Read/Write and the like) with respect to the field device 11 are transmitted to the host device through the Wi-Fi network 14. Alternatively, the data updated by the host device 21 is transmitted to the HHT 12 via the Wi-Fi network 14. Thereby, the data of the HHT 12 and host device 21 can be synchronized, so that the HHT 12 and the host device 21 can possess the latest data. Therefore, a malfunction due to a difference of the data possessed by the HHT 12 and the host device 21 is prevented, the maintainability of the data is ensured and the reliability thereof is improved.

Also, according to the field device management system 1 of the exemplary embodiment, when the state is made in which the HHT 12 can access the field device 11 in the site, the host device 21 is notified that the HHT 12 is connected to the specific loop, via the Wi-Fi network 14. Accordingly, when the setting of the field device 11 is changed from the host device 21, it is possible to notify the secondary master of the setting change. Also, since the HHT 12 can receive the change information of the specific parameter from the host device 21 via the Wi-Fi network 14, it is possible to rapidly update the information in the HHT 12, to prevent the old information from being written by the synchronization of the internal data, to ensure the maintainability of the data and to improve the reliability of the system.

In the meantime, according to the field device management system 1 of the exemplary embodiment, since the Wi-Fi network 14 is provided, a plurality of the HHTs 12 can exchange the information with the other HHTs, respectively. Also, the host device 21 can be configured as a cloud and the accumulated database can be accessed, so that it is possible to check the progressing status of the other worker by the operation log. The Wi-Fi network 14 is used so as to perform the near field communication with the host device 21. However, the present invention is not limited to the Wi-Fi network 14, and wireless LAN, Bluetooth (registered trademark), Zigbee (registered trademark) and the like may also be used.

Although the present invention has been described with reference to the exemplary embodiment, the technical scope of the present invention is not limited to the exemplary embodiment. It is apparent to one skilled in the art that the exemplary embodiment can be variously changed or improved. Also, it is obvious from the claims that the changes or improvements can be included in the technical scope of the present invention.

What is claimed is:

1. A field device management system comprising:
   a plurality of field devices equipped in a plant;
   at least one host device equipped at a place distant from the plant and configured to connect to the field devices via a first network; and
   a terminal apparatus configured to connect to the field devices via a second network and to connect to the at least one host device via a third network,
   wherein the terminal apparatus comprises:
   a first communication interface module configured to perform field communication with the field devices via the second network,
   a second communication interface module configured to perform near field communication with the at least one host device via the third network, and
   a controller configured, when updating a parameter of any one of the field devices, to transmit, through the second communication interface module to the at least one host device, a request for permission to update the parameter together with a updated parameter to be updated, receive update permission information for updating the parameter from the at least one host device through the second communication interface module, and in response to receiving the update permission information update the parameter of the field device with the updated parameter through the first communication interface module, and
   wherein when the parameter of the field device is updated with the updated parameter, the controller is further configured to transmit history information of the parameter that has been updated to the at least one host device through the second communication interface module, and
   wherein the at least one host device, which has received the history information via the third network, is further configured to update parameter for the field device that is stored on the at least one host device based on the history information to synchronize internal data of the terminal apparatus and the at least one host device.

2. The field device management system according to claim 1, wherein
   the controller is further configured to transmit an error message to the at least one host device through the second communication interface module when an error occurs when updating the parameter of the field device with the updated parameter.

3. The field device management system according to claim 1, wherein
   the terminal apparatus further comprises a display module, and
   wherein when the terminal apparatus receives a message from the at least one host device through the second communication interface module, the controller is further configured to display the message on the display module.

4. The field device management system according to claim 1,
   wherein in a state in which the terminal apparatus accesses the field devices through the first communication interface module, the controller is further configured to notify the at least one host device that the terminal apparatus is connected to a specific loop, through the second communication interface module.

5. The field device management system according to claim 1, wherein the controller is further configured to update the parameter of the field device with the updated parameter by writing a new setting value to the field device.

6. The field device management system according to claim 5, wherein the at least one host device is further configured to acquire the parameter that has been updated from the field device to determine whether the new setting value written to the field device is correct.

7. The field device management system according to claim 1, wherein the near field communication is WiFi communication.

8. The field device management system according to claim 1, wherein the first network, the second network, and the third network are different from one another.

9. A field device management system comprising:
   a plurality of field devices equipped in a plant;
   at least one host device equipped at a place distant from the plant and configured to connect to the field devices via a first network; and
   a terminal apparatus configured to connect to the field devices via a second network and to connect to the at least one host device via a third network,
   wherein the terminal apparatus comprises:
   a first communication interface module configured to perform field communication with the field devices via the second network,
   a second communication interface module configured to perform near field communication with the at least one host device via the third network, and
   a controller configured, when updating a parameter of any one of the field devices, to transmit, through the second communication interface module to the at least one host device, a request for permission to update the parameter together with a updated parameter to be updated, receive update permission information for updating the parameter from the at least one host device through the second communication interface module, and in response to receiving the update permission information update the parameter of the field device with the updated parameter through the first communication interface module, wherein the terminal apparatus further comprises a storage module, and wherein when the at least one host device updates the parameter of the field device with the updated parameter, the controller is further configured to receive history information of the parameter that has been updated from the at least one host device via the third network, and to update a parameter of the field device that is stored in the storage module based on the received history information to synchronize internal data of the terminal apparatus and the at least one host device.

10. The field device management system according to claim 9, wherein the controller is further configured to transmit an error message to the at least one host device through the second communication interface module when an error occurs when updating the parameter of the field device with the updated parameter.

11. The field device management system according to claim 9, wherein the terminal apparatus further comprises a display module, and wherein when the terminal apparatus receives a message from the at least one host device through the second communication interface module, the controller is further configured to display the message on the display module.

12. The field device management system according to claim 9, wherein in a state in which the terminal apparatus accesses the field devices through the first communication interface module, the controller is further configured to notify the at least one host device that the terminal apparatus is connected to a specific loop, through the second communication interface module.

13. The field device management system according to claim 9, wherein the controller is further configured to update the parameter of the field device with the updated parameter by writing a new setting value to the field device.

14. The field device management system according to claim 13, wherein the at least one host device is further configured to acquire the parameter that has been updated from the field device to determine whether the new setting value written to the field device is correct.

15. The field device management system according to claim 9, wherein the near field communication is WiFi communication.

16. The field device management system according to claim 9, wherein the first network, the second network, and the third network are different from one another.

* * * * *